United States Patent
Bu et al.

(10) Patent No.: US 11,533,336 B2
(45) Date of Patent: Dec. 20, 2022

(54) SECURITY VERIFICATION METHOD AND APPARATUS FOR ATTACKED SMART HOME INTERNET OF THINGS SYSTEM

(71) Applicant: NANJING UNIVERSITY, Jiangsu (CN)

(72) Inventors: Lei Bu, Jiangsu (CN); Qiuping Zhang, Jiangsu (CN); Shiyu Zhang, Jiangsu (CN); Xizao Wang, Jiangsu (CN); Siyuan Shen, Jiangsu (CN); Linzhang Wang, Jiangsu (CN); Xuandong Li, Jiangsu (CN)

(73) Assignee: NANJING UNIVERSITY, Jiangsu (CN)

( * ) Notice: Subject to any disclaimer, the term of this patent is extended or adjusted under 35 U.S.C. 154(b) by 0 days.

(21) Appl. No.: 17/642,994

(22) PCT Filed: May 22, 2020

(86) PCT No.: PCT/CN2020/091829
§ 371 (c)(1),
(2) Date: Mar. 15, 2022

(87) PCT Pub. No.: WO2021/057053
PCT Pub. Date: Apr. 1, 2021

(65) Prior Publication Data
US 2022/0337622 A1 Oct. 20, 2022

(30) Foreign Application Priority Data
Sep. 29, 2019 (CN) .......................... 201910930600.0

(51) Int. Cl.
*H04L 9/40* (2022.01)
*G05B 19/042* (2006.01)

(52) U.S. Cl.
CPC ........ *H04L 63/1466* (2013.01); *G05B 19/042* (2013.01); *H04L 63/1416* (2013.01); *G05B 2219/2642* (2013.01)

(58) Field of Classification Search
CPC ........................ H04L 63/1466; H04L 63/1416
(Continued)

(56) References Cited

U.S. PATENT DOCUMENTS 9,516,053 B1 * 12/2016 Muddu .................. H04L 41/22
10,049,220 B1 * 8/2018 Hatsutori ............ H04L 63/1416
(Continued)

FOREIGN PATENT DOCUMENTS

| CN | 106055318 A | 10/2016 |
|---|---|---|
| CN | 107037736 A | 8/2017 |
| CN | 110677413 A | 1/2020 |

OTHER PUBLICATIONS

Xiao, D., et al.. Research on Implicit Interference Detection Based on Knowledge Graph in Smart Home Automation, Chinese Journal of Computers, 2019, pp. 1190-1204, vol. 42, No. 6, China Academic Journal Electronic Publishing House, http://www.cnki.net.

*Primary Examiner* — Badri Narayanan Champakesan
(74) *Attorney, Agent, or Firm* — Hudak, Shunk & Farine Co. LPA

(57) ABSTRACT

A method and an apparatus for security verification of a smart home IoT system under attack. A finite state machine based on the device description information and IFTTT rules, and a formal specification based on a predefined specification template and input parameters, which uses a model verification tool to perform correctness verification regarding whether the finite state machine satisfies the formal specification, and verifies the output counterexample path by the model verification tool to identify the smart home devices and associated IFTTT rules that cause the system insecure. A state parameter of whether a smart home (Continued)

device is under attack is provided for each smart home device when constructing the finite state machine, and an attack intensity parameter is provided for the system when constructing the formal specification.

4 Claims, 1 Drawing Sheet

(58) Field of Classification Search
USPC .......................................................... 726/23
See application file for complete search history.

(56) References Cited

U.S. PATENT DOCUMENTS

| | | | | |
|---|---|---|---|---|
| 10,181,959 | B2* | 1/2019 | Koeninger | H04L 12/2807 |
| 11,206,278 | B2* | 12/2021 | Veeramany | H04L 63/1416 |
| 2010/0138925 | A1* | 6/2010 | Barai | H04L 63/1433 |
| | | | | 726/25 |
| 2011/0013527 | A1* | 1/2011 | Varadarajan | H04L 45/00 |
| | | | | 370/252 |
| 2018/0034701 | A1* | 2/2018 | Nagesh | H04L 67/12 |
| 2018/0309776 | A1* | 10/2018 | Sun | H04L 43/028 |
| 2019/0098032 | A1* | 3/2019 | Murphey | G06F 9/4498 |
| 2020/0287924 | A1* | 9/2020 | Zhang | G06F 16/288 |

* cited by examiner

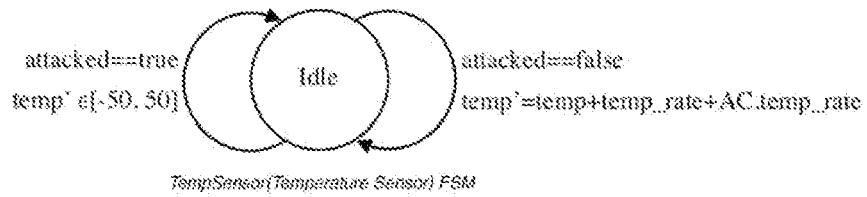
TempSensor (Temperature Sensor) FSM
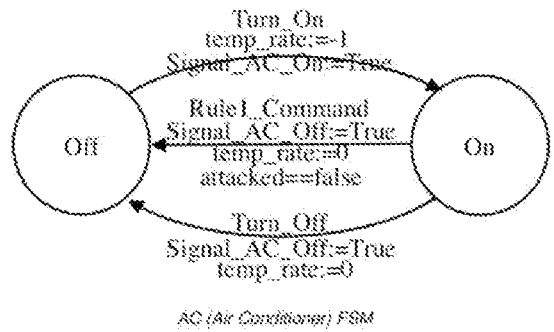
AC (Air Conditioner) FSM
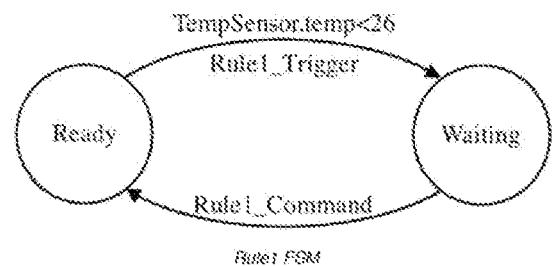
Rule1 FSM
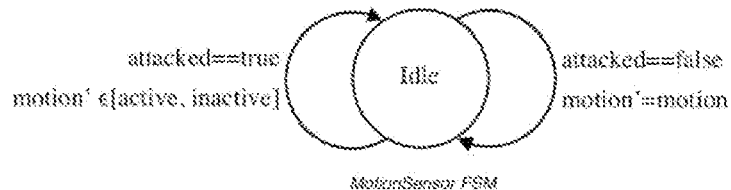
MotionSensor FSM
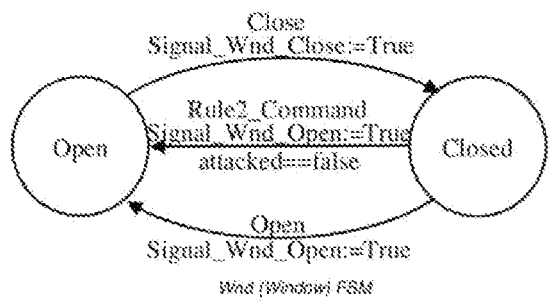
Wnd (Window) FSM
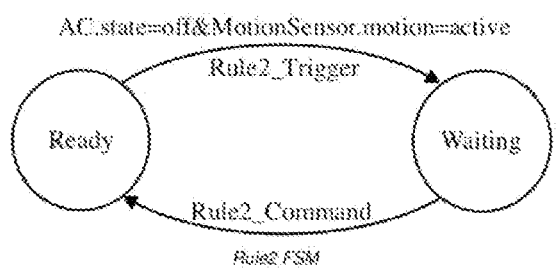
Rule2 FSM

SECURITY VERIFICATION METHOD AND APPARATUS FOR ATTACKED SMART HOME INTERNET OF THINGS SYSTEM

FIELD OF THE INVENTION

The present invention relates to security assessment and verification of a smart home Internet of Things (IoT) system.

BACKGROUND OF THE INVENTION

Smart home devices are limited by computation power and resources and have security vulnerabilities. Additionally, after delivery, the built-in operating system of many devices will not change and under supervision. Therefore, compared to traditional smart home devices based on computers, smart home IoT devices are more vulnerable to external network attacks. Common forms of attacks are privacy leakage, device imitation, DoS attacks, etc. The final result of an attack is that the sensor data is leaked and the link connecting the devices is destroyed. Therefore, although a smart home system provides users with diverse and powerful functions, it also provides hackers with new possibilities. Due to the interconnected nature of smart home systems, one or two compromised weak nodes may cause irreversible consequences, and all this may happen without the user's knowledge.

On the other hand, as the number and type of smart home devices increase, IFTTT (IF THIS THEN THAT) rules emerge, which can connect smart home devices to perform more complex operations. Specifically, IF the value of a device's variable meets a certain condition (THIS), THEN an operation in another device (THAT) is triggered. IFTTT is a rule that triggers another device to perform a certain operation when certain events occur in a smart home device. This trend has received a lot of attention due to its ability to better connect multiple smart home devices and meet complex requirements of users, and allow each user to participate in writing their own rules. The main advantage is that it allows smart devices to no longer stand alone, but to be connected as a system network and perform more complex and practical tasks. Meanwhile, through a very simple method, each user can write and use his own rules without expertise, thereby adapting the system to his daily behavior. There are already a large number of device manufacturers with a large number of users supporting this technology.

User-defined IFTTT smart home device interconnection rules are uncertain and may even have security issues. The uncertainty of IFTTT rules makes the situation more complicated when smart home devices are exposed to external network attacks. Therefore, traditional methods cannot verify the security of smart home systems.

SUMMARY OF THE INVENTION

The problem to be solved by the present invention: security verification of smart home systems under IFTTT rules.

To solve the above problem, the invention utilizes the following solutions:

According to the present invention, a method for security verification of a smart home IoT system under attack, comprising the steps of:

S1: acquiring description of smart home devices, user-defined IFTTT rules between the smart home devices and attack intensity-related forbidden behavior parameters; the attack intensity-related forbidden behavior parameters include an attack intensity threshold, smart home device parameters and forbidden state parameters, to indicate that the smart home device corresponding to the smart home device parameters cannot be in the state represented by the forbidden state parameters when the attack intensity does not exceed the attack intensity threshold; the attack intensity being the number of the smart home devices under attack;

S2: constructing a finite state machine to represent the state transition of the smart home device based on the description of the smart home devices, the IFTTT rules between the smart home devices, the state of whether the smart home device is under attack, and the restrictive assumptions that the smart home device cannot accept an external transition command and the device data is not trustworthy when under attack;

S3: constructing a formal specification for the attack intensity based on a predetermined attack intensity specification template and the attack intensity-related forbidden behavior parameters; the attack intensity specification template being a specification template describing the attack intensity threshold, the smart home device parameters and the forbidden state parameters included in the attack intensity-related forbidden behavior parameters;

S4: forming a model description document corresponding to the input format of a model verification tool based on the finite state machine and the formal specification for the attack intensity;

S5: verifying the model description document for specification correctness using the model verification tool; if correct, the system is safe, otherwise outputting a counterexample path; and S6: identifying the smart home devices and associated IFTTT rules that cause the system insecure based on the counterexample path outputted by the model verification tool.

Further, according to the method for security verification of a smart home IoT system under attack, the smart home device parameters being the device type.

An apparatus for security verification of a smart home IoT system under attack according to the present invention, comprising the following modules:

M1, used for acquiring description of smart home devices, user-defined IFTTT rules between the smart home devices and attack intensity-related forbidden behavior parameters; the attack intensity-related forbidden behavior parameters include an attack intensity threshold, smart home device parameters and forbidden state parameters, to indicate that the smart home device corresponding to the smart home device parameters cannot be in the state represented by the forbidden state parameters when the attack intensity does not exceed the attack intensity threshold; the attack intensity being the number of the smart home devices under attack;

M2, used for constructing a finite state machine to represent the state transition of the smart home device based on the description of the smart home devices, the IFTTT rules between the smart home devices, the state of whether the smart home device is under attack, and the restrictive assumptions that the smart home device cannot accept an external transition command and the device data is not trustworthy when under attack;

M3, used for constructing a formal specification for the attack intensity based on a predetermined attack intensity specification template and the attack intensity-related forbidden behavior parameters; the attack intensity specification template being a specification template describing the attack intensity threshold, the smart home device parameters and the forbidden state parameters included in the attack intensity-related forbidden behavior parameters;

M4, used for forming a model description document corresponding to the input format of a model verification tool based on the finite state machine and the formal specification for the attack intensity;

M5, used for verifying the model description document for specification correctness using the model verification tool; if correct, the system is safe, otherwise outputting a counterexample path; and M6, used for identifying the smart home devices and associated IFTTT rules that cause the system insecure based on the counterexample path outputted by the model verification tool.

Further, according to the apparatus for security verification of a smart home IoT system under attack of the present invention, the smart home device parameters being the device type.

The technical effects of the present invention are as follows.

1. The present invention provides a state parameter for each smart home device to indicate whether it is under attack, and an attack intensity parameter for the global system to construct a finite state machine and a corresponding formal specification, and then verify the finite state machine and the correctness of the formal specification using a model verification tool to check whether the smart home IoT system is secure when exposed to common external network attacks.
2. The present invention can help the user identify the smart home devices and associated IFTTT rules that cause the system insecure through model verification.
3. The method of the present invention is well adapted to the uncertainty of user-defined IFTTT rules.
4. The method of the present invention does not require a user to have specific expertise, and ordinary users can use it by following fixed rules.

BRIEF DESCRIPTION OF THE DRAWINGS

FIG. 1 is an automaton constructed in accordance with an example of the embodiment of the present invention.

DETAILED DESCRIPTION OF THE INVENTION

The present invention will be described in further detail below by reference to the accompanying drawings.

According to the present invention, a method for security verification of a smart home IoT system under attack, comprising the steps of:
S1: data acquisition;
S2: finite state machine construction;
S3: formal specification construction;
S4: model description document formation;
S5: system security verification using a model verification tool;
S6: identifying the smart home devices and associated IFTTT rules that cause the system insecure.

The "data" in the data acquisition step S1 consists of three parts: the first part is the description of smart home devices, the second part is IFTTT rules between smart home devices, and the third part is attack intensity-related forbidden behavior parameters. The description of smart home devices is defined by the smart home devices produced by various manufacturers, which can be provided automatically by the smart home devices or acquired through manual editing. It should be noted that the description of smart home devices here represents the device description information of multiple smart home devices. The description of each smart home device includes the definition of device basic information, the definition of device accessible data, the definition of device working state, the definition of device transition and the definition of API interface that the device can operate. The description of a smart home device includes but is not limited to: name, type, serial number, location, etc. The following text is an example of the description of two smart home devices, i.e., temperature sensor and air conditioner.

```
{
  "Name": "Temperature sensor",
  "Description": "",
  "InternalVariables": [
    {
      "Name": "temperature",
      "InitialValue": 20,
      "LowerBound": -50,
      "UpperBound": 50,
      "ChangeRate": "[-1,1]"
    }
  ],
  "InitState": "working",
  "WorkingStates": [
    {
      "Name": "working",
      "Dynamics": [ ]
    }
  ],
  "Transitions": [ ],
  "APIs": [ ]
}
{
  "Name": "Air_Conditioner",
  "Description": "",
  "InternalVariables": [ ],
  "InitState": "on",
  "WorkingStates": [
    {
      "Name": "off",
      "Dynamics": [
        {
          "VariableName": "temperature",
          "ChangeRate": "0"
        }
      ]
    },
    {
      "Name": "on",
      "Dynamics": [
        {
          "VariableName": "temperature",
          "ChangeRate":"-1"
        }
      ]
    }
  ],
  "Transitions": [ ],
  "APIs": [
    {
      "Name": "turn_on",
      "StartState": "off",
      "EndState": "on",
      "Trigger": null,
      "Assignments": [ ],
      "Signal": true
    },
    {
      "Name": "turn_off",
      "StartState": "on",
      "EndState": "off",
```

-continued

```
        "Trigger": null,
        "Assignments": [ ],
        "Signal": true
    }
  ]
}
```

The above text is in Json format, wherein "InternalVariables" defines the accessible data of a device. For example, the temperature sensor acquires the temperature value, where the temperature fluctuates up and down, and the rate of change of the value is set to [−1, 1]. "WorkingStates" defines the working state of a device. For example, an air conditioner has two states: "off" and "on", where the "on" state has an impact on the temperature, and the rate of impact is set to −1. The air conditioner also has two actions: "turn_on" and "turn_off", which correspond to the transition from "off" to "on" and from "on" to "off" state, respectively.

The IFTTT rules between smart home devices are edited by a user. The following exemplary IFTTT rules are based on the aforementioned smart home system consisting of four smart home devices: a temperature sensor, an air conditioner, a motion sensor, and a window.
IF Temperature_Sensor.temperature<26, THEN Air_conditioner.turn_off
IF Air_Conditioner.state=off and Motion_Sensor.motion=active THEN Window.open The above IFTTT rules contain two IFTTT rules. The first rule indicates that the air conditioner will be turned off if the temperature sensor detects that the temperature is below 26° C., and the second rule indicates that the window will be opened if the air conditioner is off and the motion sensor detects a motion.

The attack intensity-related forbidden behavior parameters are edited by a user. The attack intensity-related forbidden behavior parameters include an attack intensity threshold, smart home device parameters and forbidden state parameters. They are utilized to indicate that when the attack intensity does not exceed the attack intensity threshold, the smart home devices cannot be in the state represented by the forbidden state parameters. The attack intensity is the number of smart home devices that are under attack in the smart home system. The following example of attack intensity-related forbidden behavior parameters is based on the aforementioned smart home system consisting of four smart home devices, namely, a temperature sensor, an air conditioner, a motion sensor and a window.

{intensity_Threshold=2,device_Type=Window, state_Forbidden=open}

In the above example of the attack intensity-related forbidden behavior parameters, "intensity_Threshold" indicates the attack intensity threshold, and the specific value is "2"; "device_Type" indicates the smart home device parameter, and the specific value is "Window". "Window" is the device type, which means the smart home device parameter in this example uses device type; "state_Forbidden" indicates the forbidden state parameter, and the specific value is "open". The above example of the attack intensity-related forbidden behavior parameters shows that the smart home device with the device type "Window" cannot be in the state "open" when the attack intensity does not exceed 2. In other words, the window cannot be in the state "open" when the attack intensity does not exceed 2. The attack intensity here is the number of devices that are under attack.

It should be noted that in the above example of the attack intensity-related forbidden behavior parameters, there is only one attack intensity device forbidden behavior parameter; however, one person skilled in the art will understand that there can be more than one user-defined attack intensity device forbidden behavior parameter.

The input of step S2 is the description of the smart home devices and IFTTT rules between smart home devices acquired in step S1, as well as the state of whether the smart home device is under attack and the restrictive assumptions that the smart home device cannot accept external transition commands and the device data are not trustworthy when under attack. The finite automaton constructed in step S2 can be the hybrid automaton in the patent document CN106055318A titled "A method and device for verification and repair of smart home IoT system", and that hybrid automaton is the finite automaton of the present invention. The difference between the finite automaton of the present invention and the hybrid automaton of the patent document CN106055318A is that the present invention also provides the state of whether the smart home device is under attack and the restrictive assumptions that the smart home device cannot accept external transition commands and the device data are not trustworthy when under attack. The state of whether the smart home device is under attack is settable by adding an "attacked" parameter variable to each smart home device under the premise of its own state parameters. The "attacked" parameter is a Boolean quantity and utilized to indicate whether the smart home device is under attack. When the "attacked" parameter variable is true, the smart home device is under attack; when the "attacked" parameter variable is false, the smart home device is not under attack. The restrictive assumptions that the smart home device cannot accept external transition commands and the device data are not trustworthy when under attack contain two restrictive assumptions: the smart home device cannot accept external transition commands when under attack, and the device data are not trustworthy when under attack. The restrictive assumption "the smart home device cannot accept external transition commands when under attack" means that the "attacked" parameter variable must be false when the state of the smart home device is changing. For example, if the air conditioner accepts the external command "turn on", it will be transitioned from the "off" state to the "on" state under normal circumstances. However, under the restrictive assumption that the smart home device cannot accept external transition commands when under attack, the air conditioner can accept external commands "turn on" only if the "attacked" parameter variable is false, and the air conditioner can only be transitioned from the "off" state to the "on" state. The restrictive assumption "the device data are not trustworthy when under attack" means that the device data are controlled and thus do not show the real value when the "attacked" parameter variable of the smart home device is true. For example, with respect to the temperature sensor, when the "attacked" parameter variable is true, the reported temperature value is controlled by the attacker to take any value.

FIG. 1 shows an automaton constructed according to the example of smart home system that consists of four smart home devices, namely, a temperature sensor, an air conditioner, a motion sensor and a window, and the example of corresponding IFTTT rules described above. Each smart home device is constructed with a model based on its description. Take the air conditioner and the temperature sensor as examples, the state of the air conditioner transitions to "on" by "turn_on", and transitions to "off" by "turn_off". The air conditioner in the "on" state has a temperature impact rate of −1, while in the "off" state the temperature impact rate is 0. The temperature detected by the temperature sensor is affected by the environment and the air conditioner. Therefore, the impact rate of the environment and the air conditioner is considered. The devices are associated with each other through the IFTTT rules, and it is embodied in the model as constructing a state machine for the rules. The rule model has two states: "Ready" and "Waiting". The initial state is "Ready". The rule model receives the device information related to the rule conditions. If the conditions are met, the state transitions to "Waiting". In the next step, the state will transition back to "Ready" and the transition tag is Rule_Command. The transition tag for the corresponding state transition of the targeted device according to the command is also Rule_Command. Through this shared tag, the rule commands can be conveyed and executed. Taking Rule1 of the aforementioned smart home system as an example, determine whether the temperature detected by the temperature sensor is lower than 26° C. If the condition is met, the model state transitions from "Ready" to "Waiting". After Rule1_Command is triggered, the state transitions back to "Ready". If the "attacked" variable is false, the state of the air conditioner transitions to "off" by executing the shared transition tag and Rule1_Command simultaneously.

Step S3 is the formal specification construction step. Specifically, this step is to construct a formal specification for the attack intensity based on a predetermined attack intensity specification template and the attack intensity-related forbidden behavior parameters, wherein the attack intensity-related forbidden behavior parameters are inputted in step S1. The attack intensity specification template is a specification template describing the attack intensity-related forbidden behavior parameters, including the attack intensity threshold, the smart home device parameters and the forbidden state parameters. In particular, the specification template is: SEPC AG! (device_Type.state=state_Forbidden & intensity<=intensity_Threshold). The formal specification for the attack intensity is obtained by substituting the specific values of the attack intensity-related forbidden behavior parameters in the aforementioned example:

SEPC$AG$!(Window.state=open&intensity<=2)

In this example, the parameter "intensity" is the attack intensity. The meaning of this formal specification is: the window cannot be in the open state when the attack intensity does not exceed 2, as mentioned earlier. That is, this step converts the aforementioned attack intensity-related forbidden behavior parameters into a corresponding formal specification indicating the attack intensity device forbidden behavior.

In addition, according to the aforementioned definition that attack intensity is the number of smart home devices under attack, the "intensity" parameter is the number of the smart home devices with the added "attacked" parameter variable being true.

Step S4 is the model description document construction step. Specifically, forming his step is to form a description document parameter with a format corresponding to the input of the model verification tool based on the finite state machine and the formal specification for attack intensity. It should be understood by one skilled in the art that there are various model verification tools, such as SMV, Spin, BACH, etc. Different model verification tools have their own specific input formats. In this embodiment, SMV is used. There are several versions of SMV, such as NuSMV, CMU-SMV, Cadence-SMV, etc. NuSMV is used in this embodiment, that is, the finite state machine constructed in S2 is described in the SMV language, and the formal specification outputted from step S3 is added to construct the model description document. The model description document described in the SMV language generated from the aforementioned example of the smart home system consisting of four smart home devices, namely, a temperature sensor, an air conditioner, a motion sensor and a window, the corresponding aforementioned example of IFTTT rules and the example of attack intensity-related forbidden behavior parameters are shown as follows.

```
MODULE TemperatureSensor
FROZENVAR
    attacked: boolean;
VAR
    temp: −50... 50;
    temp_rate: −1... 1;
ASSIGN
    init(temp) := 30;
MODULE AirConditioner
FROZENVAR
    attacked: boolean;
VAR
    state: {on, off};
    signal_ac_on: boolean;
    signal_ac_off: boolean;
    temp_rate: −1... 1;
ASSIGN
    init(state) := on;
MODULE MotionSensor
FROZENVAR
    attacked: boolean;
VAR
    motion: {active, inactive};
ASSIGN
    init(motion) := inactive;
MODULE Window
FROZENVAR
    attacked: boolean;
```

```
VAR
  state: {open, closed};
  signal_wd_open: boolean;
  signal_wd_closed: boolean;
ASSIGN
  init(state) := closed;
MODULE Rule1
VAR
  state: {ready, waiting};
ASSIGN
  init(state) := ready;
MODULE Rule2
VAR
  state: {ready, waiting};
ASSIGN
  init(state) := ready;
MODULE main
FROZENVAR
  intensity: 0... 10;
VAR
  tempsensor: TemperatureSensor;
  airconditioner: AirConditioner;
  motionsensor: MotionSensor;
  window: Window;
  rule1: Rule1;
  rule2: Rule2;
ASSIGN
  next(tempsensor.temp) :=
  case
    tempsensor.attacked=TRUE: -50..50;
    tempsensor.temp+airconditioner.temp_rate+tempsensor.temp_rate >= 50: 50;
    tempsensor.temp+airconditioner.temp_rate+tempsensor.temp_rate <= -50: -50;
    TRUE: tempsensor.temp+airconditioner.temp_rate+tempsensor.temp_rate;
  esac;
  init(intensity) := toint(tempsensor.attacked) + toint(airconditioner.attacked)
    + toint(motionsensor.attacked) + toint(window.attacked);
  next(airconditioner.state) :=
  case
    next(rule1.state) = waiting &airconditioner.attacked=FALSE: off;
    TRUE: airconditioner.state;
  esac;
  next(airconditioner.signal_ac_off) :=
  case
    airconditioner.state = on & next(airconditioner.state = off): TRUE;
    TRUE: FALSE;
  esac;
  next(airconditioner.signal_ac_on) :=
  case
    airconditioner.state = off & next(airconditioner.state = on): TRUE;
    TRUE: FALSE;
  esac;
  next(airconditioner.temp_rate) :=
  case
    airconditioner.state=on: -1;
    airconditioner.state=off: 0;
    TRUE: 0;
  esac;
  next(motionsensor.motion) :=
  case
    motionsensor.attacked=TRUE: {active, inactive};
    TRUE: motionsensor.motion;
  esac;
  next(window.state) :=
  case
    next(rule2.state) = waiting &window.attacked=FALSE: open;
    TRUE: window.state;
  esac;
  next(window.signal_wd_open) :=
  case
    window.state = closed & next(window.state = open): TRUE;
    TRUE: FALSE;
  esac;
  next(window.signal_wd_closed) :=
  case
    window.state = open & next(window.state = closed): TRUE;
    TRUE: FALSE;
  esac;
  next(rule1.state) :=
  case
```

```
   tempsensor.temp<26: waiting;
   TRUE: ready;
 esac;
 next(rule2.state) :=
 case
   airconditioner.state=off &motionsensor.motion=active: waiting;
   TRUE: ready;
 esac;
SPEC AG!(window.state=open & intensity<=2)
```

Step S5 is to verify the system security with the model verification tool. Specifically, the model description document obtained in step S4 is entered into the model verification tool to verify the correctness of the specification. In this embodiment, the model description document described in the SMV language is entered into the NuSMV tool to verify the correctness of the specification. The NuSMV tool outputs two results upon verification of the correctness of the model description document described in the SMV language. The first one is the specification is verified correct; the second one is the specification is verified incorrect. When the NuSMV tool outputs the result that the specification is verified correct, it means that the system is secure; when the NuSMV tool outputs the result that the specification is verified incorrect, it outputs a counterexample path simultaneously. The counterexample path consists of a number of trace nodes arranged in order, with each trace node comprising the values of the parameter variables and the state values of all smart home devices.

Step S6 is the step of identifying the smart home devices and the associated IFTTT rules that cause the system insecure. The input to this step is the counterexample path outputted in step S5 when the model verification tool outputs the result that the specification is verified incorrect. Specifically, this is done by first locating the trace node that ultimately violates the specification, i.e., the trace node comprising the value of the device parameter variable and the state value "device_Type.state=state_Forbidden", which is typically the last trace node in the counterexample path. Then find the rule that triggers the state in the preceding trace nodes, i.e., the rule with "Rule_Command" being true and the command part causing the state "device_Type.state=state_Forbidden". After that, locate the variable and state value in the condition part of the rule. If the value of "attacked" of the device is true, then stop, indicating that the device is attacked, otherwise repeat the process and continue to find the rule that causes the variable state of the device in the preceding trace nodes. In the above example, first locate the "Window.state=open" trace node, and then find the rule that is triggered and causes the "Window.state=open" state in the preceding trace nodes, which is the second rule of the above example. The triggering condition of the second rule is "Air_Conditioner.state=off and Motion_Sensor.motion=active", and it is found that the value of "attacked" of the "Motion_Sensor" of the counterexample path is true, and the value of "attacked" of "Air_Conditioner.state=off" is false. Therefore, continue to determine the rule that is triggered and causes the state "Air_Conditioner.state=off" in the preceding trace nodes, which is the first rule of the above example with the triggering condition being "Temperature_Sensor.temperature<26", and it is found that the value of "attacked" of "temperature_Sensor" is true. Therefore, it is determined that the smart home devices that cause the system insecure in this example are "Temperature_Sensor" and "Motion_Sensor", and the associated IFTTT rules are the two rules in the example. The window is opened by attacking the "Temperature_Sensor" and "Motion_Sensor" and changing their values.

What is claimed is:

1. A method for security verification of a smart home IoT system under attack, comprising the steps of:
   S1: acquiring description of smart home devices, user-defined IFTTT rules between the smart home devices and attack intensity-related forbidden behavior parameters; the attack intensity-related forbidden behavior parameters include an attack intensity threshold, smart home device parameters and forbidden state parameters, to indicate that the smart home device corresponding to the smart home device parameters cannot be in the state represented by the forbidden state parameters when the attack intensity does not exceed the attack intensity threshold; the attack intensity being the number of the smart home devices under attack, wherein each smart home device comprises an "attacked" parameter variable represented by Boolean quantity and utilized to indicate whether the smart home device is under attack;
   S2: constructing a finite state machine to represent the state transition of the smart home device based on the description of the smart home devices, the IFTTT rules between the smart home devices, the state of whether the smart home device is under attack, and the restrictive assumptions that the smart home device cannot accept an external transition command and the device data is not trustworthy when under attack;
   S3: constructing a formal specification for the attack intensity based on a predetermined attack intensity specification template and the attack intensity-related forbidden behavior parameters; the attack intensity specification template being a specification template describing the attack intensity threshold, the smart home device parameters and the forbidden state parameters included in the attack intensity-related forbidden behavior parameters;
   S4: forming a model description document corresponding to the input format of a model verification tool based on the finite state machine and the formal specification for the attack intensity;
   S5: verifying the model description document for specification correctness using the model verification tool; if correct, the system is safe, otherwise outputting a counterexample path; and
   S6: identifying the smart home devices and associated IFTTT rules that cause the system insecure based on the counterexample path outputted by the model verification tool.

2. The method for security verification of a smart home IoT system under attack according to claim 1, wherein the smart home device parameters being the device type.

3. An apparatus for security verification of a smart home IoT system under attack according to the present invention, includes temperature and motion sensors, comprising the following modules:

M1, used for acquiring description of smart home devices, user-defined IFTTT rules between the smart home devices and attack intensity-related forbidden behavior parameters; the attack intensity-related forbidden behavior parameters include an attack intensity threshold, smart home device parameters and forbidden state parameters, to indicate that the smart home device corresponding to the smart home device parameters cannot be in the state represented by the forbidden state parameters when the attack intensity does not exceed the attack intensity threshold;

the attack intensity being the number of the smart home devices under attack, wherein each smart home device comprises an "attacked" parameter variable represented by Boolean quantity and utilized to indicate whether the smart home device is under attack;

M2, used for constructing a finite state machine to represent the state transition of the smart home device based on the description of the smart home devices, the IFTTT rules between the smart home devices, the state of whether the smart home device is under attack, and the restrictive assumptions that the smart home device cannot accept an external transition command and the device data is not trustworthy when under attack;

M3, used for constructing a formal specification for the attack intensity based on a predetermined attack intensity specification template and the attack intensity-related forbidden behavior parameters; the attack intensity specification template being a specification template describing the attack intensity threshold, the smart home device parameters and the forbidden state parameters included in the attack intensity-related forbidden behavior parameters;

M4, used for forming a model description document corresponding to the input format of a model verification tool based on the finite state machine and the formal specification for the attack intensity;

M5, used for verifying the model description document for specification correctness using the model verification tool; if correct, the system is safe, otherwise outputting a counterexample path; and M6, used for identifying the smart home devices and associated IFTTT rules that cause the system insecure based on the counterexample path outputted by the model verification tool.

4. The apparatus for secure verification of a smart home IoT system under attack according to claim 3, wherein the smart home device parameters being the device type.

* * * * *